(12) United States Patent
Cho et al.

(10) Patent No.: US 9,817,572 B2
(45) Date of Patent: Nov. 14, 2017

(54) OVERLAPPED TRANSPARENT DISPLAY AND CONTROL METHOD THEREOF

(71) Applicant: LG ELECTRONICS INC., Seoul (KR)

(72) Inventors: Eunhyung Cho, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 14/455,572

(22) Filed: Aug. 8, 2014

(65) Prior Publication Data

US 2015/0293654 A1 Oct. 15, 2015

(30) Foreign Application Priority Data

Apr. 9, 2014 (KR) ........................ 10-2014-0042301

(51) Int. Cl.
| | |
|---|---|
| *G06F 3/0484* | (2013.01) |
| *G06F 3/0489* | (2013.01) |
| *G06F 1/16* | (2006.01) |
| *G06F 3/038* | (2013.01) |
| *G06F 3/048* | (2013.01) |

(52) U.S. Cl.
CPC ........ *G06F 3/04897* (2013.01); *G06F 1/1654* (2013.01); *G06F 3/038* (2013.01); *G06F 3/048* (2013.01)

(58) Field of Classification Search
CPC .. G06F 3/0484; G06F 3/0481; G06F 3/04897; G06F 3/038; G06F 1/1654
See application file for complete search history.

(56) References Cited

U.S. PATENT DOCUMENTS

| | | | |
|---|---|---|---|
| 2007/0226642 | A1 | 9/2007 | Soulier |
| 2011/0187655 | A1* | 8/2011 | Min ...................... G06F 1/1643 345/173 |
| 2011/0216206 | A1 | 9/2011 | Ashforth et al. |
| 2012/0060089 | A1* | 3/2012 | Heo ...................... G06F 1/1647 715/702 |

* cited by examiner

*Primary Examiner* — Andrey Belousov
*Assistant Examiner* — Seth A Silverman
(74) *Attorney, Agent, or Firm* — Birch, Stewart, Kolasch & Birch, LLP

(57) ABSTRACT

Disclosed is a display device providing a user interface to switch a control object of a pointer from the display device to an external transparent display device. The display device includes a display unit including a first display area, a communication unit to communicate with an external transparent display device including a second display area, and a control unit. The control unit receives a pointer control signal, detects a first area among the first display area overlapped by the external transparent display device, sets a user interface to a position proximate to at least a portion of the edge of the first area, transmits the pointer control signal to the external transparent display device when the pointer overlaps at least a portion of the user interface, and transmits no pointer control signal when the pointer moves into the first area in a path not passing through the user interface.

20 Claims, 22 Drawing Sheets

OVERLAPPED TRANSPARENT DISPLAY AND CONTROL METHOD THEREOF

This application claims the benefit under 35 U.S.C. §119(a) to Patent Application No. 10-2014-0042301, filed in the Republic of Korea on Apr. 9, 2014, all of which are hereby expressly incorporated by reference into the present application.

BACKGROUND OF THE INVENTION

Field of the Invention

The present specification relates to an overlapped transparent display and a control method thereof, and more particularly to a transparent display overlapping another display, and a control method thereof.

Discussion of the Related Art

A variety of display devices have been developed according to developments in electronics. Display devices including various display elements, such as a CRT, LCD, PDP, OLED, etc., have been used. In addition, research on transparent display devices to enable watching in opposite directions of the display device is being conducted.

A transparent display device includes a transparent display unit that advantageously allows a user to view not only content displayed on the display unit, but also an object present at the back of the display unit. Accordingly, when the transparent display device is used in conjunction with another display device, the aforementioned advantage of the transparent display device may be further enhanced.

FIG. 1 shows a situation in which a display device 100 including a first display area 101 and a transparent display device 200 including a second display area 201 are simultaneously used. The transparent display device 200 may be a handheld device. In addition, the transparent display device 200 may be controlled using at least one of a touch sensitive panel and various other input devices.

As exemplarily shown in FIG. 1, the display device 100 may be controlled using a pointer 161. On the other hand, the transparent display device 200 may be controlled using a touch sensitive panel. Accordingly, simultaneous control of the display device 100 and the transparent display device 200 may inconvenience the user. In addition, in the case of the transparent display device 200 in the form of a handheld device, a stand for the transparent display device 200 is required.

SUMMARY OF THE INVENTION

Accordingly, the present specification is directed to an overlapped transparent display device and a control method thereof that substantially obviate one or more problems due to limitations and disadvantages of the related art.

An object of the present specification is to provide a method for effectively controlling a transparent display device overlapping another display device.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a display device includes a display unit including a first display area, the display unit configured to display a pointer, a communication unit configured to communicate with an external transparent display device including a second display area, and a control unit configured to control the display unit and the communication unit, wherein the control unit is further configured to receive a pointer control signal to control the pointer, detect a first area of the first display area overlapped by the external transparent display device, set a position of a user interface to a position proximate to at least a portion of the edge of the first area, the user interface to switch a control object of the pointer, transmit the pointer control signal to the external transparent display device via the communication unit when the pointer overlaps at least a portion of the user interface, and transmit no pointer control signal to the external transparent display device when the pointer moves into the first area in a path not through an area other than the user interface.

The user interface may be set to a position proximate to at least a portion of the edge of the first area contacting with an edge of the first display area.

The control unit may change at least one of a position, size, and shape of the user interface based on at least one of a position and movement direction of the pointer.

When a control object of the pointer is the second display area and the pointer overlaps with at least a portion of the user interface, the control unit may switch a control object of the pointer from the second display area to the first display area.

The user interface may include a plurality of switching areas to switch a control object of the pointer from the first display area to the second display area or from the second display area to the first display area.

The plurality of switching areas may include a first switching area to switch a control object of the pointer from the first display area to the second display area, and a second switching area to switch a control object of the pointer from the second display area to the first display area, and the first switching area and the second switching area may be set to different positions.

The user interface may be displayed on at least one of the first display area and the second display area corresponding to the set position of the user interface.

The control unit may change display properties of the user interface when the pointer moves into a first predetermined distance from the user interface.

The control unit may restore the changed display properties of the user interface when the pointer moves outside a second predetermined distance from the user interface.

When at least one of a size, shape, and position of the first area is changed, the control unit may reset at least one of a size, shape, and position of the user interface based on at least one of the size, shape, and position of the changed first area.

When a control object of the pointer is switched, the control unit may provide feedback to indicate switching of the control object or the control object of the pointer.

The feedback may include at least one of an auditory feedback, a tactile feedback, an olfactory feedback, and a visual feedback.

The visual feedback may comprise adjustment of at least one of transparency, blur, color, brightness, and contrast of an image displayed on at least one of the first display area and the first area.

The visual feedback may comprise at least one of changing at least one of a size, shape, transparency, and color of the pointer, displaying an entire first area or a portion of the first area with a preset color, and highlighting the edge of the first area.

At least one of transparency, blur, color, brightness, and contrast of an entire image or a portion of the image displayed on the second display area of the external transparent display device may be adjusted based on a control object of the pointer.

The pointer may be displayed on the second display area when the external transparent display device receives the pointer control signal.

The control unit may transmit the pointer control signal when the pointer hovers over the user interface for a predefined time or more.

The control unit may detect the first area by sensing at least one of sound, light, and a magnetic field created by the external transparent display device, and/or by sensing a pattern at the back of the external transparent display device.

In accordance with another embodiment, a display device includes a transparent display unit, a communication unit configured to communicate with an external display device, and a control unit configured to control the transparent display unit and the communication unit, wherein the control unit is further configured to detect an overlapping of the transparent display unit with the external display device, and control the display device based on a pointer of the external display device upon receiving a pointer control signal from the external display device via the communication unit, and wherein the external display device is configured to detect a first area where the transparent display unit overlaps with a display area of the external display device, set a position of a user interface to a position proximate to at least a portion of an edge of the first area, the user interface to switch a control object of the pointer, transmit the pointer control signal to the display device when the pointer overlaps at least a portion of the user interface, and transmit no pointer control signal to the display device when the pointer moves into the first area in a path passing through an area other than the user interface.

In accordance with another embodiment, a control switching method includes detecting a first area of a first display area of a display device overlapped by an external transparent display device, setting a position of a user interface to a position proximate to at least a portion of an edge of the first area, the user interface to switch a control object of a pointer, and transmitting a pointer control signal to the external transparent display device when the pointer overlaps at least a portion of the user interface, wherein the external transparent display device is controlled based on the pointer upon receiving the pointer control signal.

In accordance with a further embodiment, a control switching method includes detecting an overlapping of a transparent display unit of a transparent display device with an external display device, and controlling the transparent display device based on a pointer of the external display device upon receiving a pointer control signal from the external display device, wherein the external display device is configured to detect a first area where the transparent display unit overlaps with a display area of the external display device, set a position of a user interface to a position proximate to at least a portion of the edge of the first area, the user interface to switch a control object of the pointer, transmit the pointer control signal to the transparent display device when the pointer overlaps at least a portion of the user interface, and transmit no pointer control signal to the transparent display device when the pointer moves into the first area in a path passing through an area other than the user interface.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings.

DETAILED DESCRIPTION OF THE INVENTION

Figure 1:
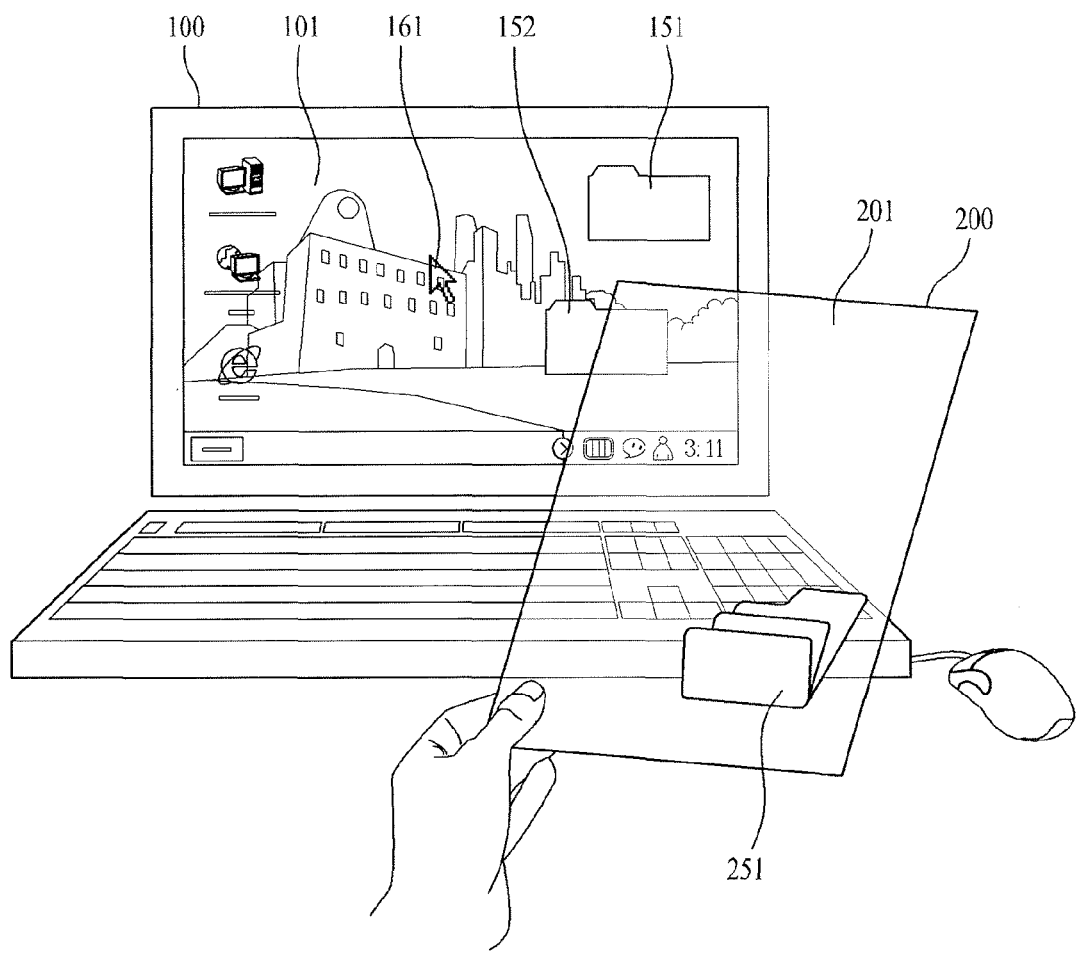
FIG. 1 is a view showing use environment of a display device and a transparent display device.

Hereinafter, exemplary embodiments of the present specification for concrete realization of the above described object will be described in detail with reference to the accompanying drawings. In this case, configurations and operations of the present specification as illustrated in the drawings and explained with reference to the drawings will be described in at least one embodiment, and technical sprit of the present specification and core configurations and operations thereof should not be limited by the at least one embodiment.

Although the terms used in the following description are selected, as much as possible, from general terms that are widely used at present while taking into consideration the functions obtained in accordance with the embodiments, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the present specification. Accordingly, it should be noted that the terms used in the specification should be construed based on practical meanings thereof and the whole content of this specification, rather than being simply construed based on names of the terms.

In addition, descriptions of specific configurations and functions with regard to the conceptual embodiments of the present specification disclosed herein are merely given to explain the conceptual embodiments of the present specification. Accordingly, the conceptual embodiments of the present specification may be implemented in various ways, and should not be construed as being limited to the embodiments set forth herein.

Accordingly, while the present specification is susceptible to various modifications and alternative forms, specific embodiments thereof are shown by way of example in the drawings and will herein be described in detail. It should be understood, however, that there is no intent to limit the present specification to the particular forms disclosed, but on the contrary, the present specification is to cover all modifications, equivalents, and alternatives falling within the spirit and scope of the specification as defined by the claims.

In addition, the terms first and/or second of the present specification may be used to explain various components, but the components should not be limited by these terms. The terms are simply used to discriminate one component from the other component, without being deviated from the conceptual scope of the present specification. Accordingly, the term first component may be replaced by the term second component, and similarly the term second component may be replaced by the term first component.

Throughout the specification, assuming that a portion "includes" a component, this means that the portion may further include other components rather than precluding the other components unless the context clearly indicates otherwise. In addition, the terms "unit", "device", etc. described in the specification mean a component that processes at least one function or operation, and may be realized by hardware, software, or any combination thereof.

Figure 2:
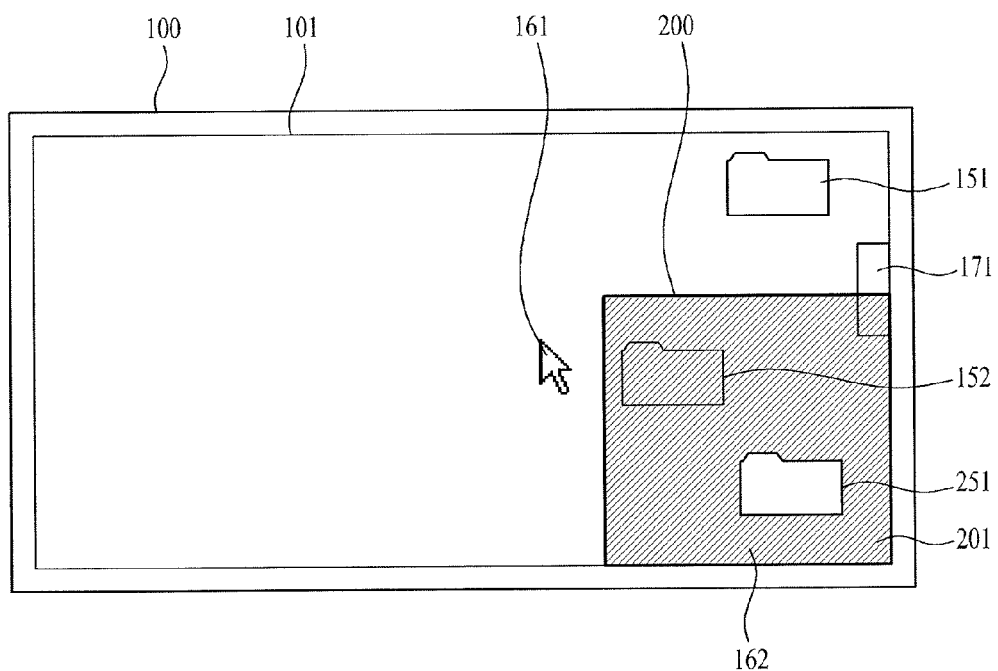
FIG. 2 is a view showing the display device and the transparent display device overlapping each other.

FIG. 2 shows the display device and the transparent display device overlapping each other.

Referring to FIG. 2, the transparent display device 200 is positioned to overlap the first display area 101 of the display device 100. As the transparent display device 200 overlaps the display device 100, an overlapped area 162 is generated. The transparent display device 200 may be fixed using a bezel of the display device 100. In this case, the transparent display device 200 may be controlled using a pointer 161. The pointer 161 may be controlled by at least one of a mouse, an optical pointing device, a track ball, and various other input devices.

Meanwhile, images 151 and 152, which include at least one of an icon, a shortcut, a gadget, and a background image, are displayed on the first display area 101, and an image 251, which includes at least one of an icon, a shortcut, a gadget, and a background image, is displayed on the second display area 201 of the transparent display device 200. In addition, the transparent display device 200 transmits an image at the back thereof. Accordingly, in a case in which the pointer 161 is controlled in the overlapped area 162, the user has difficulty in judging whether he/she controls the image 152 on the first display area 101 or the image 251 on the second display area 201.

Figure 3:
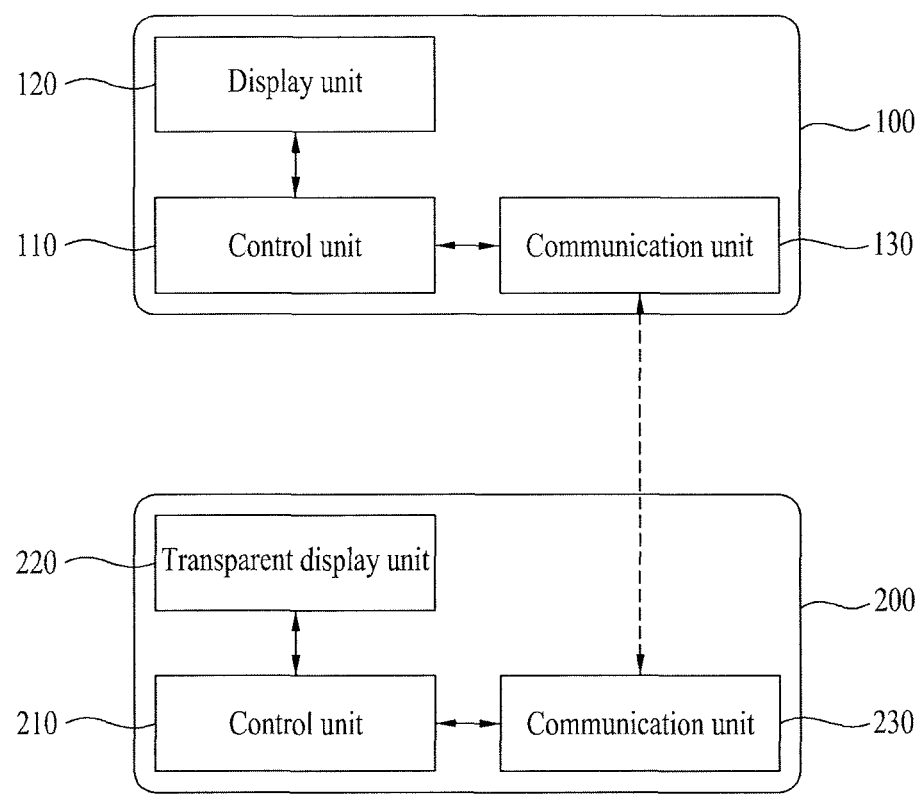
FIG. 3 is a view showing configurations of the display device and the transparent display device according to one embodiment of the present specification.

FIG. 3 is a view showing configurations of the display device and the transparent display device according to one embodiment of the present specification.

The display device 100 of FIG. 3 includes a display unit 120 to display an image, a communication unit 130 to communicate with the external transparent display device 200, and a control unit 110 to control the display unit 120 and the communication unit 130. The control unit 110 may receive a pointer control signal for control of a pointer, and detect an overlapped area generated when the external transparent display device 200 overlaps the display device 100. The control unit 110 may detect the overlapped area by sensing at least one of sound, light, and a magnetic field created by the transparent display device 200 and/or by sensing a pattern at the back of the transparent display device 200. In addition, the control unit 110 may set a user interface for switching of a control object of the pointer to a position proximate to at least a portion of edges of the overlapped area. Then, the control unit 110 may transmit a pointer control signal to the external transparent display device 200 when the pointer overlaps at least a portion of the user interface or when the pointer hovers over the user interface for a predetermined time or more. The control unit 110 may change at least one of a position, size, and shape of the user interface based on at least one of a position and movement direction of the pointer. The control unit 110 may switch a control object of the pointer from the transparent display device 200 to the display device 100. In addition, the control unit 110 may change or restore display properties of the user interface based on a distance between the pointer and the user interface. In addition, when at least one of a shape, size, and position of the overlapped area is changed, the control unit 110 may reset at least one of a size, shape, and position of the user interface based on at least one of the size, shape, and position of the changed overlapped area. Meanwhile, when a control object of the pointer is switched, the control unit 110 may provide feedback to display switching of a control object or the control object.

The transparent display device 200 of FIG. 3 includes a transparent display unit 220 including a transparent display area, a communication unit 230 to communicate with the display device 100, and a control unit 210 to control the transparent display unit 220 and the communication unit 230. The control unit 110 may detect that the transparent display device 200 overlaps the external display device 100, and may control the transparent display device 200 based on the pointer of the display device 100 upon receiving a pointer control signal from the display device 100.

The display device 100 and the transparent display device 200 communicate with each other using the communication units 130 and 230. The display device 100 and the transparent display device 200 may be coupled to each other in a wired and/or wireless manner. Coupling of the display device 100 and the transparent display device 200 may include Near Field Communication (NEC). Bluetooth, Wi-FI, WiDi, USB, infrared communication and/or an arbitrary wired or wireless communication protocol.

FIGS. 4A, 4B, 4C, and 4D are views for explanation of different overlapping manners of the display device and the transparent display device.

Figure 4A:
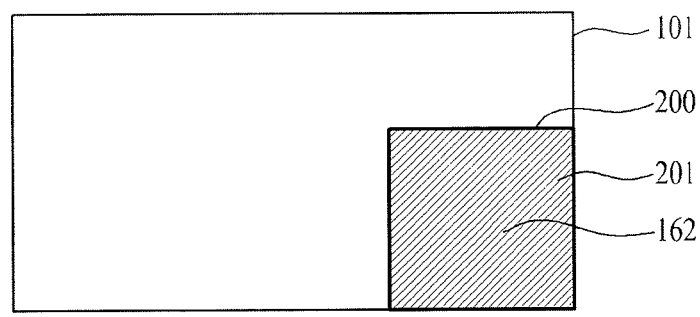
FIGS. 4A, 4B, 4C, and 4D are views for explanation of different overlapping manners of the display device and the transparent display device.
Figure 4B:
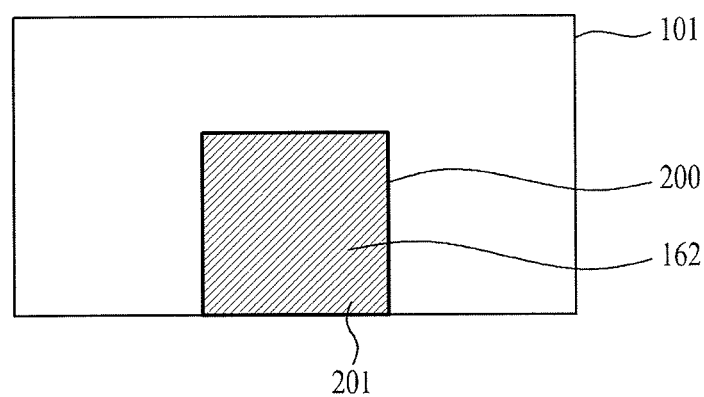
Figure 4C:
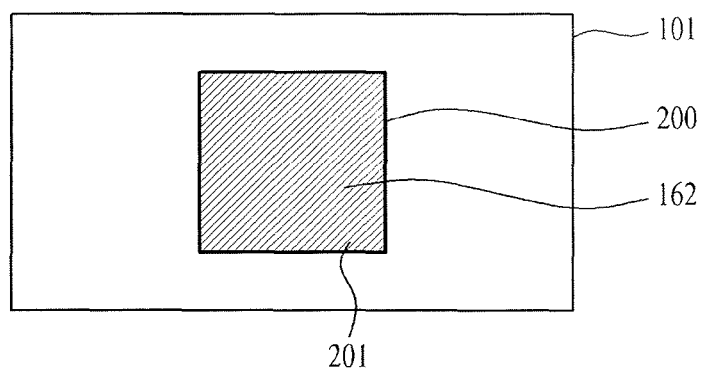
Figure 4D:
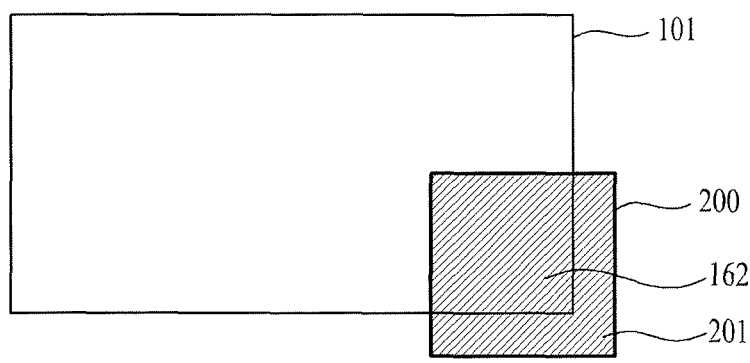

As exemplarily shown in FIGS. 4A to 4C, the entire second display area 201 of the transparent display device 200 may overlap the first display area 101. Alternatively, as exemplarily shown in FIG. 4D, only a portion of the second display area 201 of the transparent display device 200 may overlap the first display area 101. In addition, the second display area 201 of the transparent display device 200 may overlap the entire first display area 101 or a portion of the first display area 101.

Meanwhile, although bezels of the first display area 101 and the second display area 201 are not shown in FIGS. 4A to 4D for convenience of explanation, the first display area 101 and/or the second display area 201 may further include bezels respectively. In addition, to fix the transparent display device 200, the transparent display device 200 may be positioned to come into contact with at least one edge of the first display area 101.

FIGS. 5A, 5B, 5C, and 5D are views for explanation of how to use a user interface according to one embodiment of the present specification.

As exemplarily shown in FIGS. 5A to 5D, a user interface 171 is provided to switch a control object of the pointer 161. That is, a control object of the pointer 161 may be switched via interaction of the pointer 161 and the user interface 171. For example, whether or not the user interface 171 is used may be judged by comparing coordinates of the pointer 161 with the position of the user interface 171.

Figure 5A:
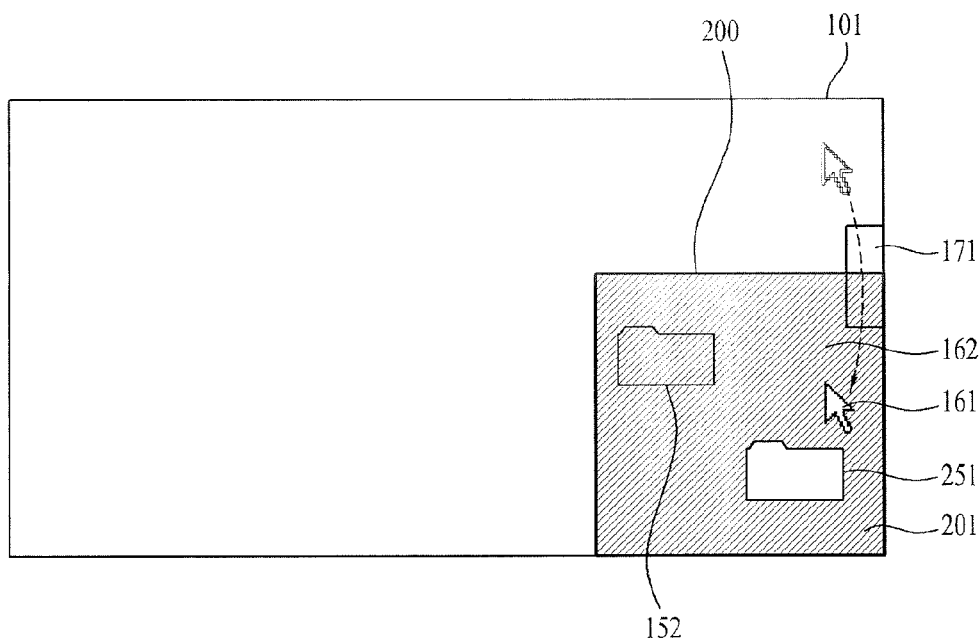
FIGS. 5A, 5B, 5C, and 5D are views for explanation of how to use a user interface according to one embodiment of the present specification.

Referring to FIG. 5A, the user interface 171 to switch a control object of the pointer 161 is located at the edge of the overlapped area 162. The pointer 161, used to control the first display area 101, moves to the overlapped area 162 in a path overlapping at least a portion of the user interface 171. When the pointer 161 moves to the overlapped area 162 by passing through the user interface 171, the display device 100 transmits a pointer control signal to the external transparent display device 200. The transparent display device 200, which has received the pointer control signal, may be controlled based on the pointer 161, and the pointer 161 may control the image 251 on the second display area 201. That is, a control object of the pointer 161 is switched from the first display area 101 to the second display area 201. Similarly, in a case in which a control object of the pointer 161 is the second display area 201 and the pointer 161 moves in a path overlapping at least a portion of the user interface 171, a control object of the pointer 161 may be switched from the second display area 201 to the first display area 101.

Figure 5B:
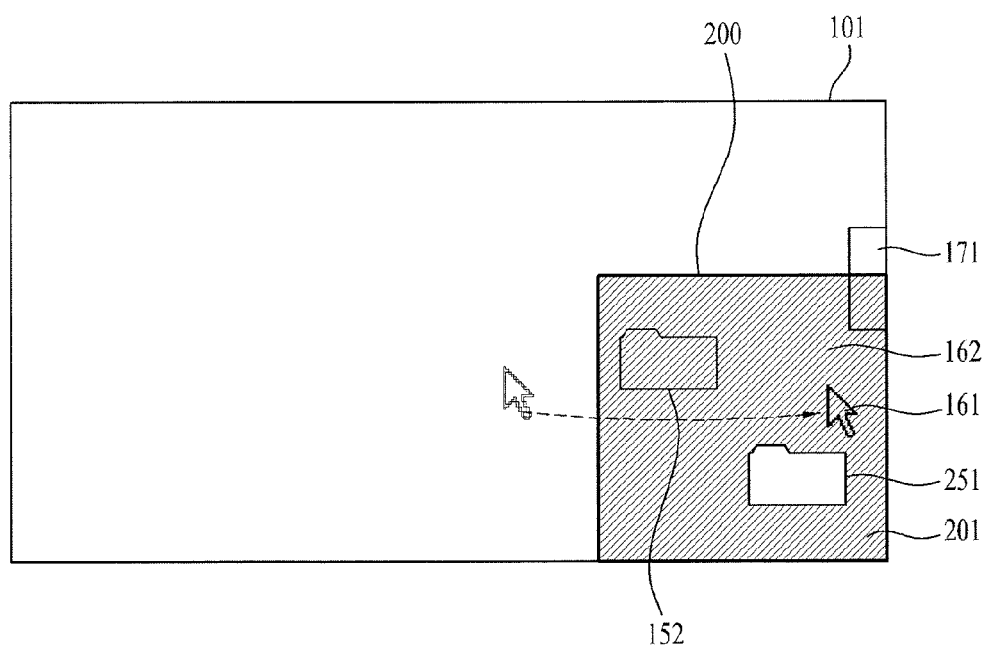

Referring to FIG. 5B, the pointer 161, used to control the first display area 101 moves to the overlapped area 162 in a path other than the user interface 171. In this case, the display device 100 does not transmit a pointer control signal to the external transparent display device 200. Thus, a control object of the pointer 161 is still the first display area 101, and the pointer 161 may control the image 152 on the first display area 101.

Figure 5C:
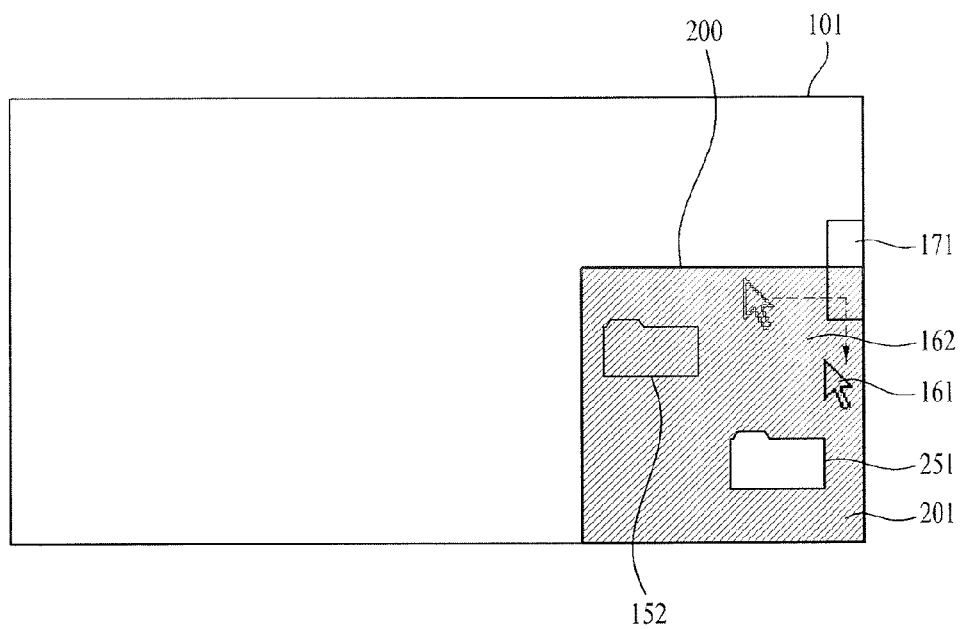

In addition, as exemplarily shown in FIG. 5C, a control object of the pointer 161 may be switched as the pointer 161 moves in the overlapped area 162. The pointer 161 moves to pass through the user interface 171 in the overlapped area 162. In this case, the transparent display device 200 may be controlled based on the pointer 161. In the same manner, a control object of the pointer 161 may be switched from the second display area 201 to the first display area 101.

Figure 5D:
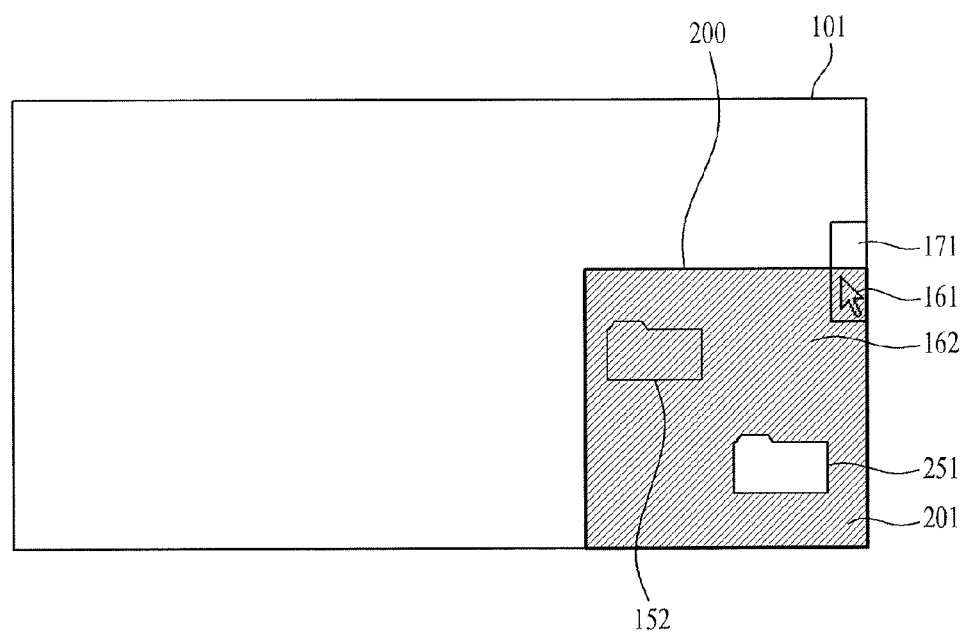
Figure 6A:
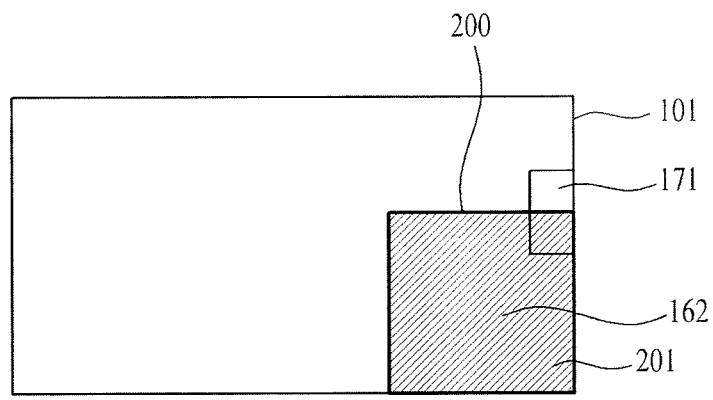
FIGS. 6A, 6B, 6C, 6D, 6E, and 6F are views showing various embodiments of a user interface according to the present specification.
Figure 6B:
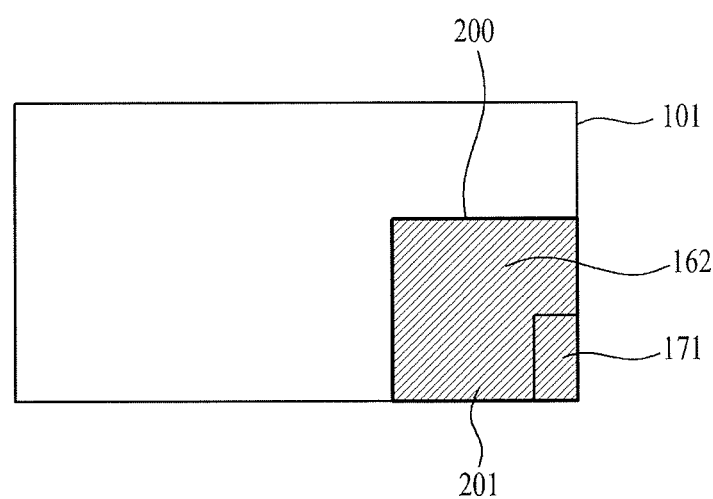
Figure 6C:
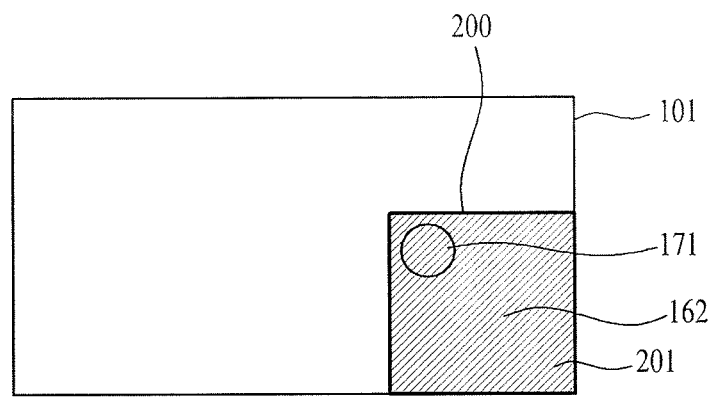
Figure 6D:
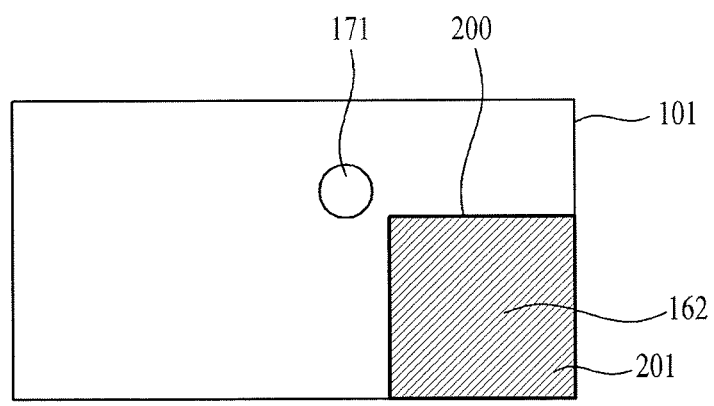
Figure 6E:
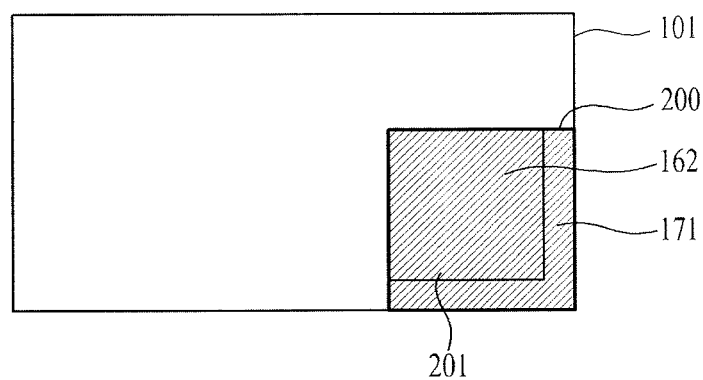
Figure 6F:
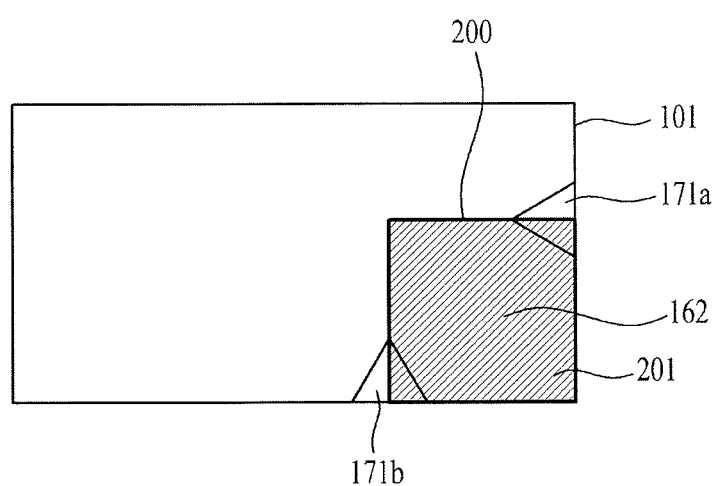

In addition, as exemplarily shown in FIG. 5D, in a case in which the pointer 161 hovers over the user interface 171 for a predetermined time or more, a control object of the pointer 161 may be switched. In the same manner, a control object of the pointer 161 may be switched from the second display area 201 to the first display area 101.

FIGS. 6A, 6B, 6C, 6D, 6E, and 6F are views showing various embodiments of a user interface according to the present specification.

As exemplarily shown in FIGS. 6A to 6F, the user interface 171, 171a or 171b is set to a position proximate to at least a portion of edges of the overlapped area 162. As exemplarily shown in FIGS. 6A, 6B, and 6E, the user interface 171 may be set to a position where the edge of the first display area 101 contacting with the edge of the overlapped area 162. In addition, the user interface 171, as exemplarily shown in FIGS. 6C and 6D, may be set to a position proximate to the edge of the overlapped area 162. In addition, as exemplarily shown in FIGS. 6A to 6F, the user interface 171 may have one of rectangular, triangular, circular, and various other shapes, and may have one of various sizes. In addition, as exemplarily shown in FIG. 6F, a plurality of user interfaces 171a and 171b may be set.

Figure 7A:
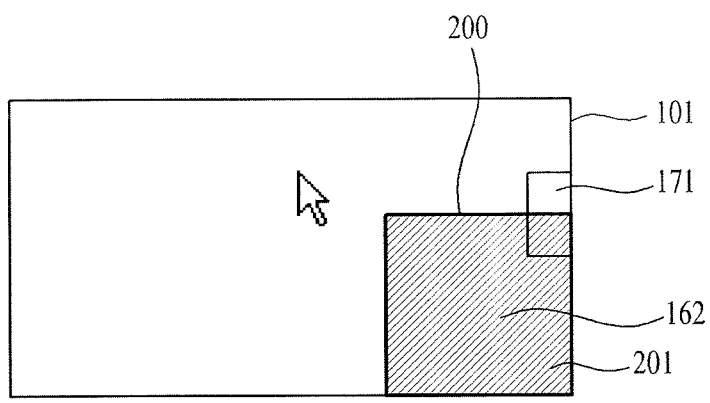
FIGS. 7A and 7B are views showing the position of a user interface based on the position of a pointer.
Figure 7B:
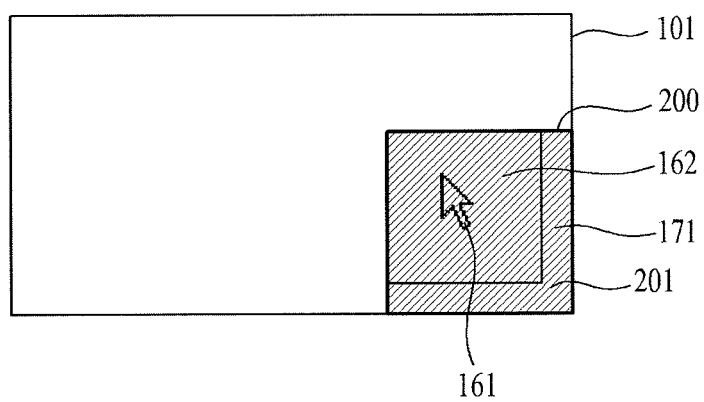

FIGS. 7A and 7B show the position of the user interface based on the position of the pointer.

At least one of the position, size, shape, and number of the user interfaces 171 may be adjusted based on the position of the pointer 161. For example, in a case in which the pointer 161 is located at the outside of the overlapped area 162 as exemplarily shown in FIG. 7A, the user interface 171 may be set to a portion of an upper edge of the overlapped area 162. In addition, the user interface 171 may be located at the left side of the overlapped area 162 in a case in which the pointer 161 is present in the left region of the first display area 101, and may be located at the upper side of the overlapped area 162 in a case in which the pointer 161 is present in the upper region of the first display area 101. Conversely, the user interface 171 may be located at the right side of the overlapped area 162 in a case in which the pointer 161 is present in the right region of the first display area 101, and may be located at the lower side of the overlapped area 162 in a case in which the pointer 161 is present in the lower region of the first display area 101. That is, the position of the user interface 171 may be set based on the position of the pointer 161 relative to the first display area 101.

In addition, as exemplarily shown in FIG. 7B, in a case in which the pointer 161 moves to the overlapped area 162, the user interface 171 may be set to all positions where edges of the first display area 101 come into contact with edges of the overlapped area 162. Without being limited to illustrations of FIGS. 7A and 7B, at least one of a position, size, shape, and number of the user interfaces 171 may be changed in various ways based on the position of the pointer 161.

Figure 8A:
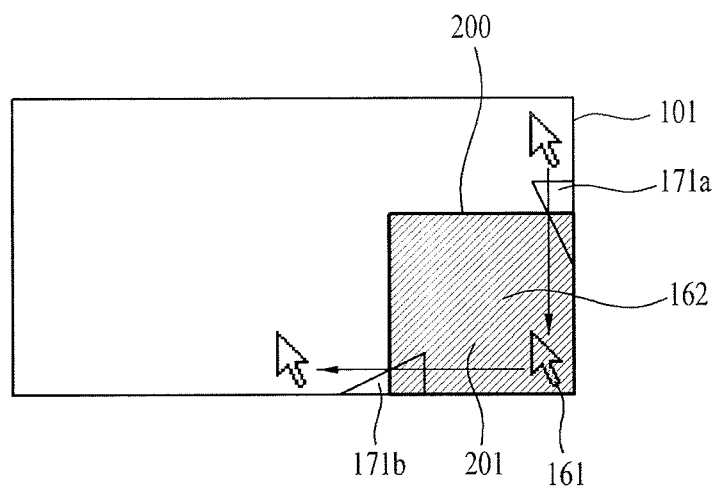
FIGS. 8A and 8B are views for explanation of types of a user interface according to one embodiment of the present specification.
Figure 8B:
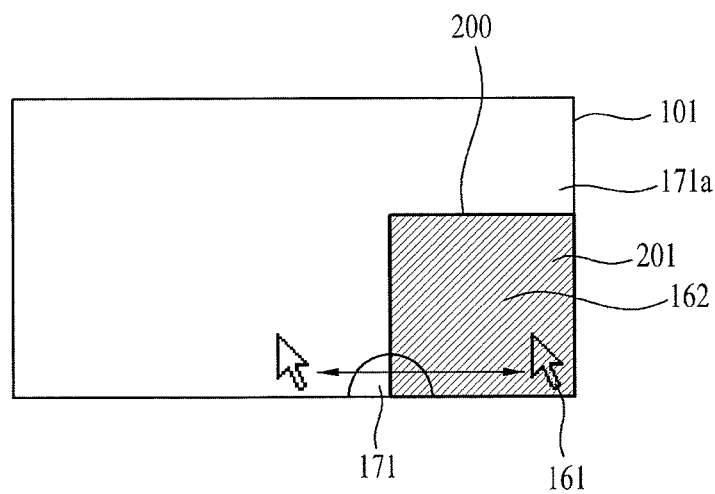

FIGS. 8A and 8B are views for explanation of types of the user interface according to one embodiment of the present specification.

Referring to FIG. 8A, there are provided two user interfaces 171a and 171b set to different positions. A control object of the pointer 161 may be switched from the first display area 101 to the second display area 201 using the user interface 171a. On the other hand, a control object of the pointer 161 may be switched from the second display area 201 to the first display area 101 using the user interface 171b. That is, the respective user interfaces 171a and 171b may switch a control object of the pointer 161 only in a given direction. In addition, the user interfaces 171a and 171b, as exemplarily shown in FIG. 8A, may be shaped to indicate a control object switching direction (for example, from the first display area 101 to the display area 201 or vice versa).

Referring to FIG. 8B, there is provided a single user interface 171. A control object of the pointer 161 may be switched from the first display area 101 to the second display area 201 or from the second display area 201 to the first display area 101 using the user interface 171. That is, the user interface 171 may switch a control object of the pointer 161 in both directions.

Referring again to FIGS. 8A and 8B, once a control object of the pointer 161 has been switched from the first display area 101 to the second display area 201, a movement range of the pointer 161 may be limited to the overlapped area 162 or the second display area 201 of the transparent display device 200. In this case, the pointer 161 may need to pass through the user interface (171b of FIG. 8A and 171 of FIG. 8B) in order to move to the first display area 101 other than the overlapped area 162.

Figure 9:
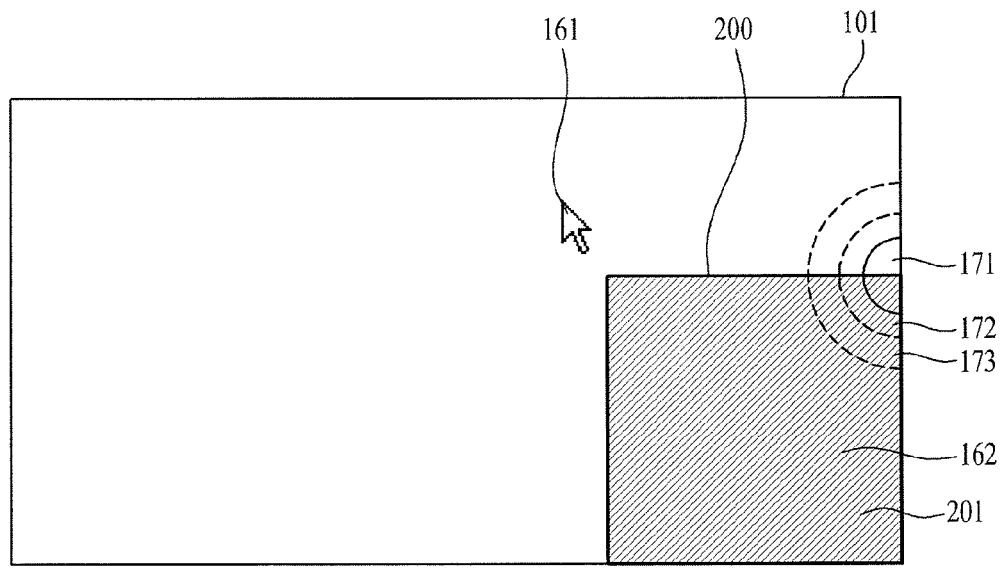
FIG. 9 is a view for explanation of how to display a user interface according to one embodiment of the present specification.

FIG. 9 is a view for explanation of how to display the user interface according to one embodiment of the present specification.

Referring to FIG. 9, there is provided the user interface 171 to switch a control object of the pointer 161. The user interface 171 may be displayed on the first display area 101 and/or the second display area 201 corresponding to a position where the user interface 171 is set.

In addition, display properties (e.g., at least one of transparency, blur, size, shape, color, brightness, and contrast) of the user interface 171 may be changed based on a distance between the pointer 161 and the user interface 171. When the pointer 161 moves into a first distance 172, display properties of the user interface 171 may be changed. Then, when the pointer 161 moves outside a second distance 173, the changed display properties may be restored. For example, when the pointer 161 moves into the first distance 172, the user interface 171 may begin to be displayed, or at least one of the color, transparency, size, and shape of the user interface 171 may be changed. In addition, when the pointer 161 moves outside the second distance 173, display of the user interface 171 may end, or at least one the color, transparency, size, and shape of the changed user interface 171 may be restored.

Although FIG. 9 shows that the first distance 172 is greater than the second distance 173, the second distance 173 may be greater than the first distance 172, or the first distance 172 and the second distance 173 may be equal to each other.

Figure 10A:
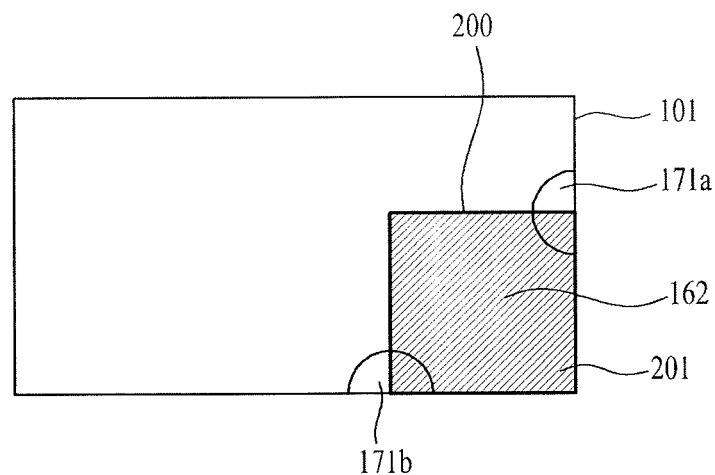
FIGS. 10A, 10B, and 10C are views showing user interfaces based on movement of an overlapped area.
Figure 10B:
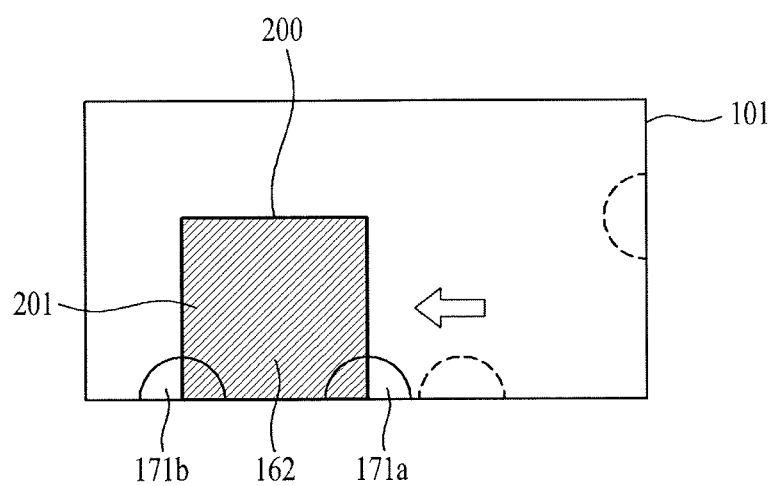
Figure 10C:
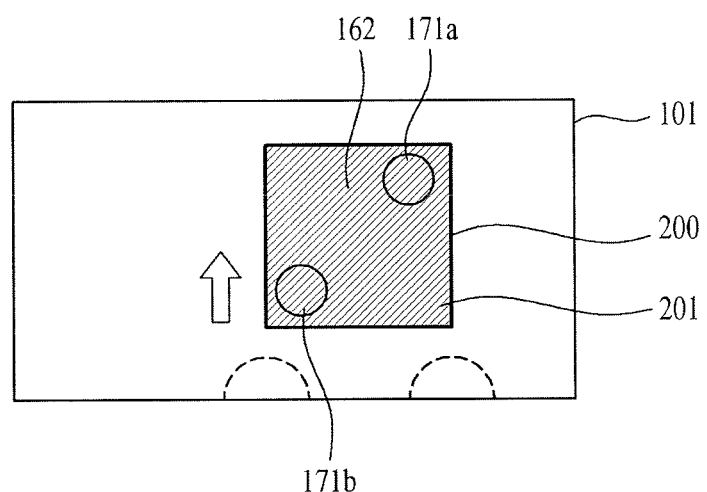

FIGS. 10A, 10B, and 10C show the user interfaces based on movement of the overlapped area.

Referring to FIG. 10A, the transparent display device 200 overlaps a right lower corner region of the first display area 101. The user interfaces 171a and 171b are provided respectively at a right upper position and a left lower position of the overlapped area 162. At least one of the size, shape, and position of the overlapped area 162 may be changed via movement of the transparent display device 200 relative to the first display area 101. Referring to FIG. 10B, as the transparent display device 200 moves, the position of the overlapped area 162 is displaced, and the positions of the user interfaces 171a and 171b are displaced. In addition, referring to FIG. 10C, as the transparent display device 200 moves upward, the position of the overlapped area 162 is displaced, and the position, size, and shape of the user interfaces 171a and 171b are reset.

In addition, as at least one of the size, shape, and position of the overlapped area 162 is changed, at least one of the size, shape, position, and number of the user interfaces may be reset. For example, when the size of the overlapped area 162 is reduced, the size of the user interface may be reduced. In addition, the number of the user interfaces may be changed based on the number of edges of the overlapped area 162 contacting with the first display area 101. In addition, the transparent display device 200 may be located in the upper region, the lower region, the left region, or the right region of the first display area 101, and the position of the user interface may be changed to the upper side, the lower side, the left side, or the right side based on the position of the transparent display device 200.

FIGS. 11A, 11B, 11C, and 11D show visual feedback based on a control object of the pointer.

The display device 100 and/or the transparent display device 200 may provide feedback to indicate switching of a control object or feedback to display a control object of the pointer 161 in a case in which a control object of the pointer 161 is switched. The feedback may include at least one of an auditory feedback, a tactile feedback, an olfactory feedback, and a visual feedback.

Figure 11A:
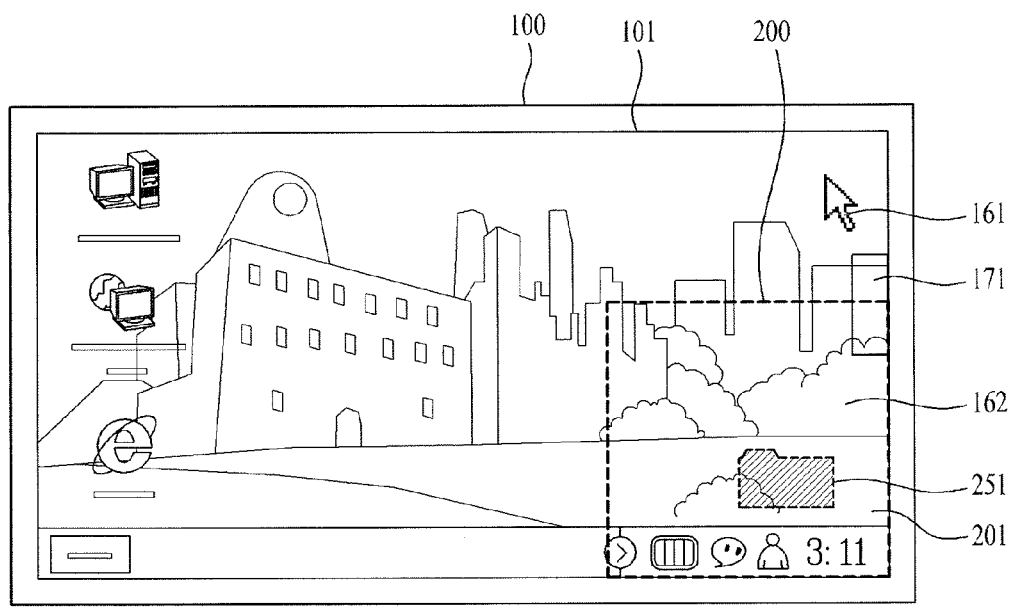
FIGS. 11A, 11B, 11C, and 11D are views showing visual feedback based on a control object of a pointer.

Referring to FIG. 11A, in a case in which a control object of the pointer 161 is the first display area 101, the image 251 on the second display area 201 of the transparent display device 200 may be displayed as a transparent or semi-transparent image. In addition, the image 251 on the second display area 201 may not be displayed.

Figure 11B:
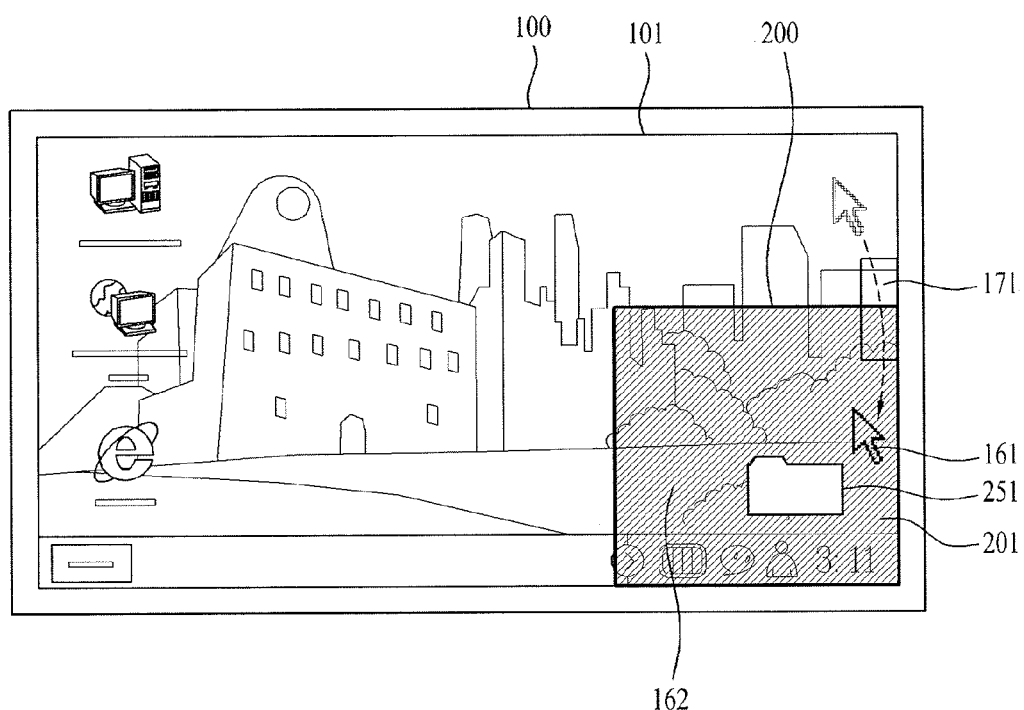

Referring to FIG. 11B, a control object of the pointer 161 is the transparent display device 200. In this case, the pointer 161 may be displayed on the first display area 101 and/or the second display area 201. In addition, at least one of the transparency, blur, color, brightness, and contrast of the transparent display device 200 may be adjusted based on a control object of the pointer 161. In addition, a control object of the pointer 161 may be indicated by highlighting the periphery of the transparent display device 200 and/or the second display area 201. Meanwhile, the aforementioned visual feedback may be acquired by controlling the first display area 101. For example, a control object of the pointer 161 and/or a control area may be indicated by highlighting the periphery of the overlapped area 162 of the first display area 101. In addition, a control object of the pointer 161 and/or a control area may be indicated by adjusting at least one of the transparency, blur, color, brightness, and contrast of an image present in the overlapped area 162 of the first display area 101.

Figure 11C:
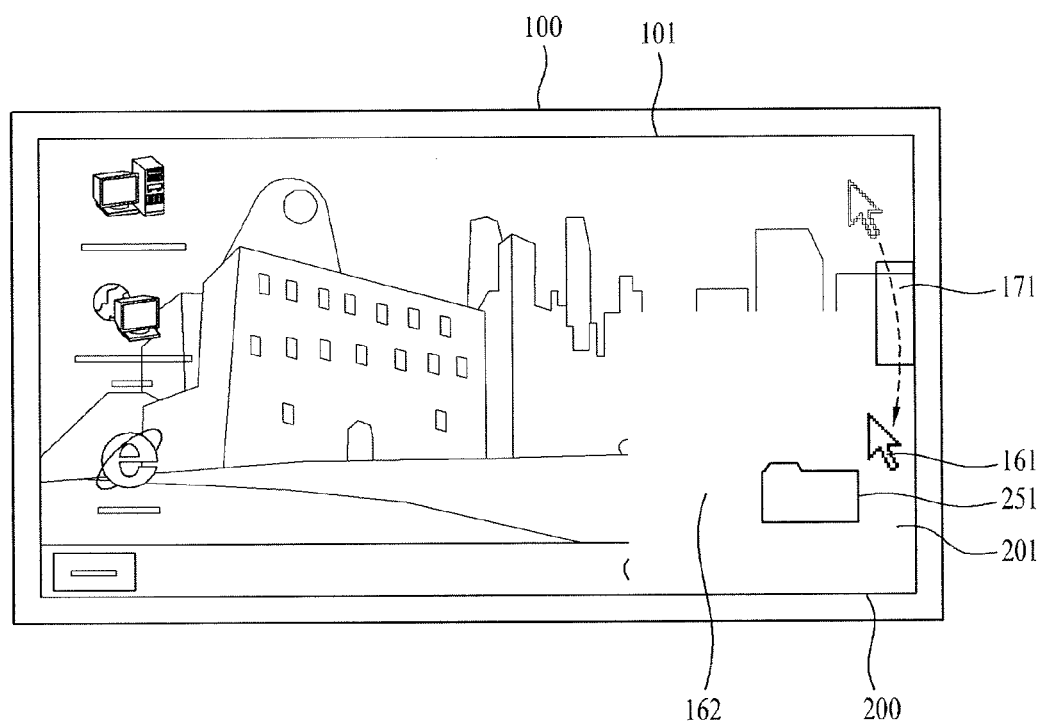

Referring to FIG. 11C, a control object of the pointer 161 is the transparent display device 200. Visual feedback may increase visibility of the image 251 on the second display area 201 of the transparent display device 200. For example, the transparent display device 200 may cause a background image on the first display area 101 to be invisible by adjusting at least one of the transparency, blur, color, brightness, and contrast of the transparent display unit. In addition, the display device 100 may display the overlapped area 162 on the first display area 101 with a predetermined color (e.g., white), thereby increasing visibility of the image 251 on the second display area 201.

Figure 11D:
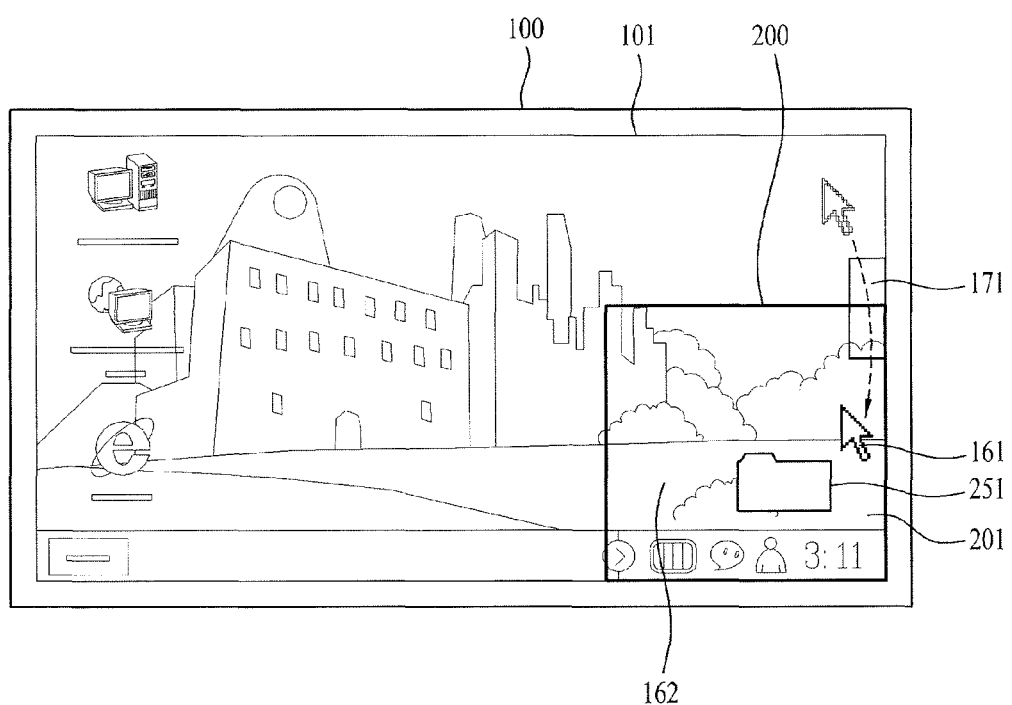

Referring to FIG. 11D, a control object of the pointer 161 is the second display area 201. In this case, the display device 100 may adjust at least one of the transparency, blur, color, brightness, and contrast of the entire first display area 101 or a portion of the first display area 101. In addition, the display device 100 may not display other images (e.g., icons and gadgets) except for a background image.

In addition, visual feedback may change at least one of the size, shape, transparency, and color of the pointer 161 based on a control object of the pointer 161. For example, in a case in which a control object of the pointer 161 is the transparent display device 200, the size of the pointer 161 may be changed based on the size of the transparent display device 200 and/or the size of the overlapped area 161. In addition, the color of the pointer 161 may be adaptively changed based on the color of a background image displayed on the second display area 201.

Figure 12A:
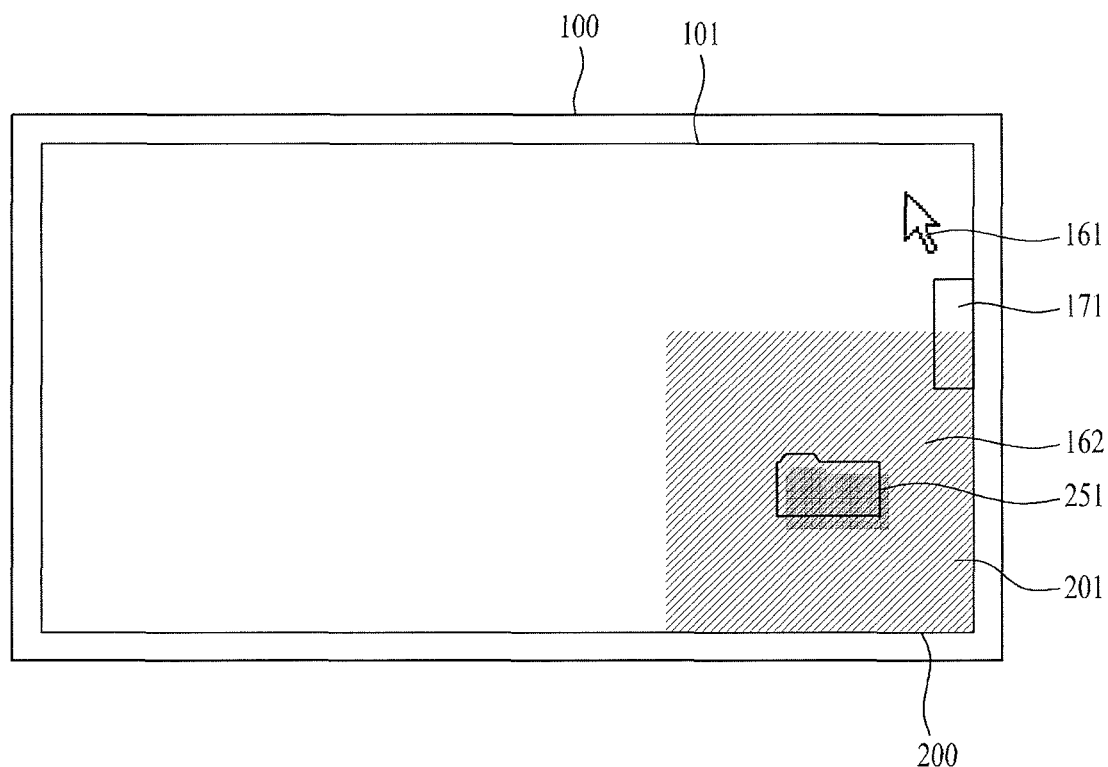
FIGS. 12A and 12B are views showing visual feedback of a transparent display device based on a control object of a pointer.
Figure 12B:
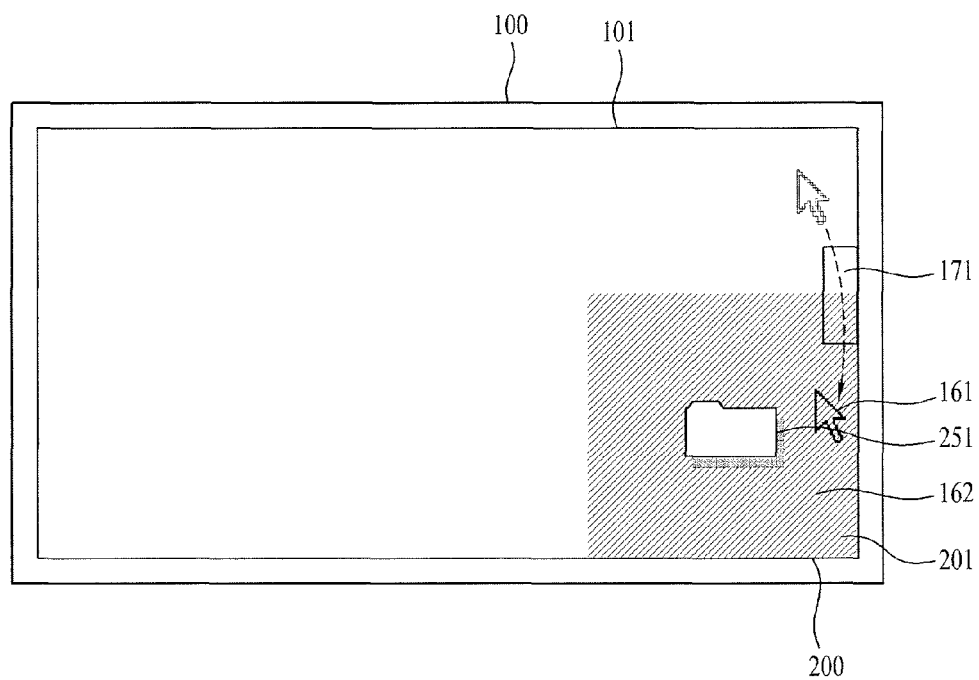

FIGS. 12A and 12B show visual feedback of the transparent display device based on a control object of a pointer.

As described above, visual feedback may be provided by the display device 100 and/or the transparent display device 200. FIGS. 12A and 12B explain one embodiment of visual feedback provided by the transparent display device 200. In addition, the visual feedback provided by the transparent display device 200 may be combined with visual feedback provided by the display device 100.

Referring to FIG. 12A, in a case in which a control object of the pointer 161 is the first display area 101, the transparent display device 200 may display the transparent or semitransparent image 251 on the second display area 201 thereof. As such, an image on the first display area 101 at the back of the second display device 200 may be emphasized.

Referring to FIG. 12B, in a case in which a control object of the pointer 161 is the transparent display device 200, the transparent display device 200 may reduce the transparency of the image 251 on the second display area 201 thereof. In addition, the transparent display device 200 may increase visibility of the image 251 on the second display area 201 by adjusting at least one of the transparency, blur, color, brightness, and contrast of a background image on the second display area 201.

Figure 13:
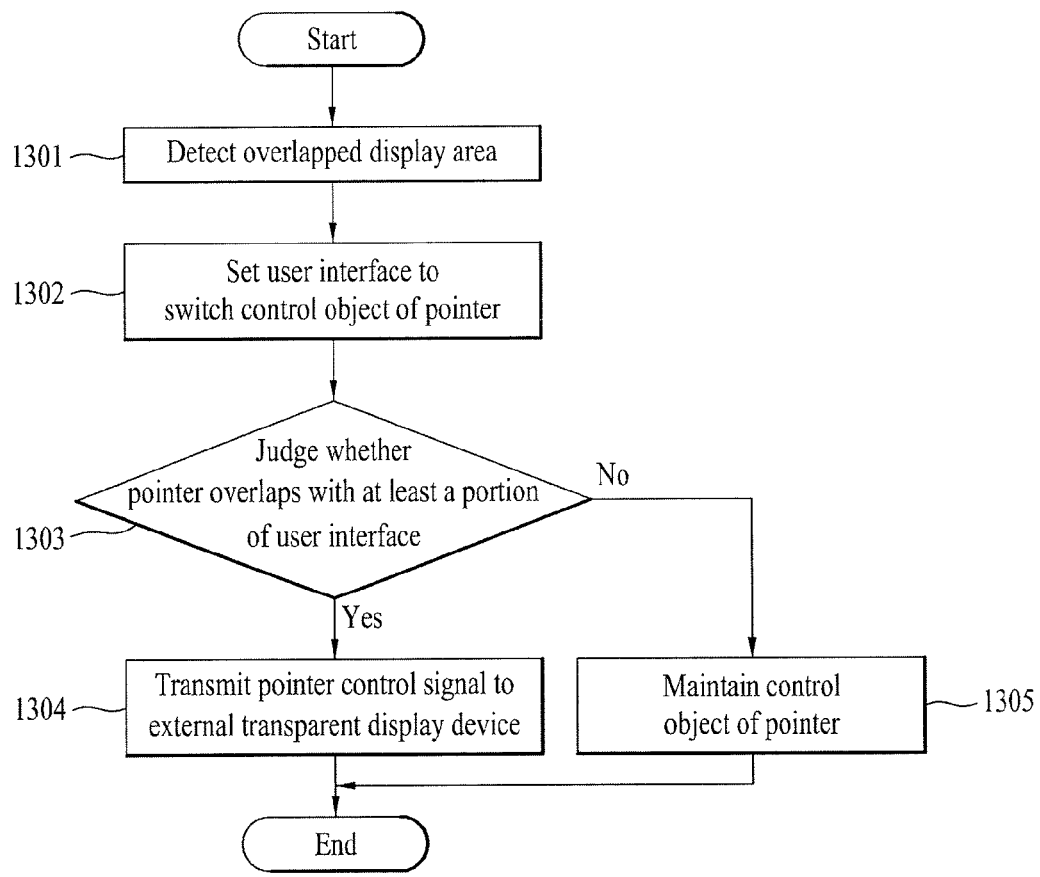
FIG. 13 is a flowchart of a control switching method according to one embodiment of the present specification.

FIG. 13 is a flowchart of a control switching method according to one embodiment of the present specification.

Referring to FIG. 13, the display device may detect a display area thereof overlapped by the external transparent display device thereabove (1301). As described above with reference to FIG. 3, the overlapped display area may be detected by sensing at least one of sound, light, and a magnetic field created by the external transparent display device. In addition, the overlapped display area may be detected by sensing a pattern at the back of the external transparent display device. The display device may include at least one of an optical sensor, a sound sensor, a pixel sensor, a touch sensor, and a magnetic field sensor, in order to detect the overlapped display area. Meanwhile, as described above with reference to FIGS. 4A, 4B, 4C, and 4D, the display device may overlap with the external transparent display device in various ways.

Then, when the overlapped display area is detected, the display device may set a position of the user interface that switches a control object of the pointer (1302). The position of the user interface may be set at or near edges of the overlapped display area. In addition, the display device may select at least one of the position, size, and shape of the user interface based on at least one of the position, size, and shape of the overlapped display area. In addition, as described above with reference to FIGS. 6A to 10C, the user interface may be set to ones of various positions, sizes, and shapes.

In addition, the display device may trace a movement path of the pointer and judge whether or not the pointer overlaps with at least a portion of the user interface (1303). This judgment may be based on comparison results of path coordinates of the pointer and coordinates of the user interface. For example, when the pointer moves through the user interface, or when the pointer hovers over the user interface for a predetermined time or more, that the pointer overlaps at least a portion of the user interface may be judged.

Upon judging that the pointer overlaps at least a portion of the user interface, the display device transmits a pointer control signal to the external transparent display device (1304). This transmission may be implemented using wired or wireless communication of the received pointer control signal.

Upon judging that the pointer does not overlap at least a portion of the user interface, the display device maintains a control object of the pointer (1305). That is, in this case, the display device does not transmit a pointer control signal to the external transparent display device. Accordingly, a control object of the pointer is still the display device.

Meanwhile, the external transparent display device detects whether or not the external transparent display device overlaps the display device. In addition, upon receiving a pointer control signal from the display device, the external transparent display device is controlled based on the received pointer control signal.

Meanwhile, as described above with reference to FIGS. 9, and 11A to 12B, the display device and/or the external transparent display device may provide feedback to indicate switching of a control area of the pointer or the control area.

The display device and the control method thereof according to the present specification should not be limited and applied to configurations and methods of the above embodiments, and some or all of the embodiments may be selectively combined with one another to provide various modifications.

Meanwhile, the control switching method of the present specification may be implemented as code that may be written on a processor readable recording medium and thus read by a processor provided in the display device. The processor readable recording medium may be any type of recording device in which data is stored in a processor readable manner. Examples of the processor readable recording medium may include a ROM, a RAM, a CD-ROM, a magnetic tape, a floppy disc, and an optical data storage device. In addition, the processor readable recording medium may be distributed over a plurality of computer systems connected to a network so that processor readable code is written thereto and executed therefrom in a decentralized manner.

According to the embodiments as described above, in an overlapped transparent display and a control method thereof, through provision of a user interface to switch a control object of a pointer, a transparent display device and the other display device overlapping each other may be effectively controlled.

Further, as the transparent display device and the other display device overlap each other in use, the transparent display device may be easily fixed.

Furthermore, each control of the transparent display device may be possible as the transparent display device is controlled using a pointer control device coupled to the other display device.

It will be apparent that, although the preferred embodiments of the present specification have been shown and described above, the present specification is not limited to the above-described specific embodiments, and various modifications and variations can be made by those skilled in the art without departing from the gist of the appended claims. Thus, it is intended that the modifications and variations should not be understood independently of the technical sprit or prospect of the specification.

What is claimed is:

1. A display device comprising:
a display unit including a first display area, the display unit displaying a pointer;
a communication unit configured to communicate with an external transparent display device including a second display area; and
a control unit configured to control the display unit and the communication unit,
wherein the control unit is further configured to:
receive a pointer control signal to control the pointer;
detect a first area of the first display area that is an overlapped intersection of the display device and the external transparent display device;
set a position of a user interface to a predetermined position to at least a portion of an edge of the first area, the user interface to switch a control object of the pointer;
transmit the pointer control signal to the external transparent display device via the communication unit when the pointer overlaps at least a portion of the user interface;
transmit no pointer control signal to the external transparent display device when the pointer moves into the first area in a path passing through an area other than the user interface; and
when a size of the first area is changed, adjust a size of the user interface based on the size of the changed first area.

2. The display device according to claim 1, wherein the user interface is set to a predetermined position to at least a portion of the edge of the first area contacting with an edge of the first display area.

3. The display device according to claim 2, wherein the control unit is further configured to change at least one of a position, size, and shape of the user interface based on at least one of a position and movement direction of the pointer.

4. The display device according to claim 1, wherein the user interface includes a plurality of switching areas to switch a control object of the pointer from the first display area to the second display area or from the second display area to the first display area.

5. The display device according to claim 4, wherein the plurality of switching areas include a first switching area to switch a control object of the pointer from the first display area to the second display area, and a second switching area to switch a control object of the pointer from the second display area to the first display area, and
wherein the first switching area and the second switching area are set to different positions.

6. The display device according to claim 1, wherein the user interface is displayed on at least one of the first display area and the second display area corresponding to the set position of the user interface.

7. The display device according to claim 6, wherein the control unit is further configured to change display properties of the user interface when the pointer moves into a first predetermined distance from the user interface.

8. The display device according to claim 7, wherein the control unit restores the changed display properties of the user interface when the pointer moves outside a second predetermined distance from the user interface.

9. The display device according to claim 1, wherein the control unit is further configured to, when a control object of the pointer is switched, provide feedback to indicate switching of the control object or the control object of the pointer.

10. The display device according to claim 9, wherein the feedback comprises at least one of an auditory feedback, a tactile feedback, an olfactory feedback, and a visual feedback.

11. The display device according to claim 10, wherein the visual feedback comprises adjustment of at least one of transparency, blur, color, brightness, and contrast of an image displayed on at least one of the first display area and the first area.

12. The display device according to claim 10, wherein the visual feedback comprises at least one of:
changing at least one of a size, shape, transparency, and color of the pointer;
displaying an entire first area or a portion of the first area with a preset color; and
highlighting the edge of the first area.

13. The display device according to claim 1, wherein at least one of transparency, blur, color, brightness, and contrast of an entire image or a portion of the image displayed on the second display area of the external transparent display device is adjusted based on a control object of the pointer.

14. The display device according to claim 1, wherein the pointer is displayed on the second display area when the external transparent display device receives the pointer control signal.

15. The display device according to claim 1, wherein the control unit is further configured to transmit the pointer control signal when the pointer hovers over the user interface for a predefined time or more.

16. The display device according to claim 1, wherein the control unit is further configured to detect the first area by sensing at least one of sound, light, and a magnetic field created by the external transparent display device, and/or by sensing a pattern at the back of the external transparent display device.

17. The display device according to claim 1, wherein the user interface is a graphical object displayed at an edge of the overlapped intersection of the display device and the external transparent display device, and
wherein the user interface is smaller than the first area that is the overlapped intersection of the display device and the external transparent display device.

18. A transparent display device comprising:
a transparent display unit including a second display area;
a communication unit configured to communicate with an external display device including a first display area; and
a control unit configured to control the transparent display unit and the communication unit,
wherein the control unit is further configured to:
detect an overlapping of the transparent display unit with the external display device;
control the transparent display device based on a pointer of the external display device upon receiving a pointer control signal from the external display device via the communication unit; and
when a control object of the pointer is the second display area and the pointer overlaps with at least a portion of the user interface, switch a control object of the pointer from the second display area to the first display area, and
wherein the external display device is configured to:
detect a first area of the first display area that is an overlapped intersection of the transparent display device and the external display device;

set a position of a user interface to a predetermined position to at least a portion of an edge of the first area, the user interface to switch a control object of the pointer;

transmit the pointer control signal to the transparent display device when the pointer overlaps at least a portion of the user interface;

transmit no pointer control signal to the external display device when the pointer moves into the first area in a path passing through an area other than the user interface; and when a size of the first area is changed, adjust a size of the user interface based on the size of the changed first area.

19. A control switching method comprising:

detecting a first area of a first display area of a display device that is an overlapped intersection of the display device and an external transparent display device including a second display area;

setting a position of a user interface to a predetermined position to at least a portion of an edge of the first area, the user interface to switch a control object of a pointer;

transmitting a pointer control signal to the external transparent display device when the pointer overlaps at least a portion of the user interface; and when a size of the first area is changed, adjusting a size of the user interface based on the size of the changed first area, wherein the external transparent display device is controlled based on the pointer upon receiving the pointer control signal.

20. A control switching method comprising:

detecting an overlapped intersection of a transparent display device including a second display area and an external display device including a first display area;

controlling the transparent display device based on a pointer of the external display device upon receiving a pointer control signal from the external display device; and wherein the external display device is configured to:

detect a first area where the transparent display unit overlaps with the first display area of the external display device;

set a position of a user interface to a predetermined position to at least a portion of the edge of the first area, the user interface to switch a control object of the pointer;

transmit the pointer control signal to the transparent display device when the pointer overlaps at least a portion of the user interface; and transmit no pointer control signal to the transparent display device when the pointer moves into the first area in a path passing through an area other than the user interface; and when a size of the first area is changed, adjust a size of the user interface based on the size of the changed first area.

* * * * *